(12) United States Patent
Sharifi

(10) Patent No.: US 9,367,887 B1
(45) Date of Patent: Jun. 14, 2016

(54) MULTI-CHANNEL AUDIO VIDEO FINGERPRINTING

(71) Applicant: Google Inc., Mountain View, CA (US)

(72) Inventor: Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/880,762

(22) Filed: Oct. 12, 2015

Related U.S. Application Data

(63) Continuation of application No. 14/019,086, filed on Sep. 5, 2013, now Pat. No. 9,189,826.

(51) Int. Cl.
*G06K 9/00* (2006.01)
*G06T 1/00* (2006.01)

(52) U.S. Cl.
CPC .................... *G06T 1/0021* (2013.01)

(58) Field of Classification Search
USPC .......................... 382/103, 115–118, 124–127
See application file for complete search history.

(56) References Cited

U.S. PATENT DOCUMENTS

| | | | | |
|---|---|---|---|---|
| 5,475,421 A * | 12/1995 | Palmer | ................ | G06F 3/04847 348/14.1 |
| 5,594,859 A * | 1/1997 | Palmer | ................ | G06F 3/04847 348/E7.081 |
| 2002/0196974 A1* | 12/2002 | Qi | ...................... | G06K 9/00711 382/170 |
| 2003/0033347 A1* | 2/2003 | Bolle | ................ | G06F 17/30253 718/107 |
| 2006/0182311 A1* | 8/2006 | Lev | ......................... | G06K 9/325 382/103 |
| 2011/0188704 A1* | 8/2011 | Radhakrishnan | .... | H04N 17/004 382/100 |
| 2011/0216937 A1* | 9/2011 | Radhakrishnan | . | G06F 17/30799 382/100 |
| 2013/0077823 A1* | 3/2013 | Mestha | ................ | A61B 5/0075 382/103 |

* cited by examiner

*Primary Examiner* — Alex Liew
(74) *Attorney, Agent, or Firm* — Fenwick & West LLP

(57) ABSTRACT

Implementations are provided herein relating to audiovisual matching. Audio and video channel data is merged to create a single multi-channel fingerprint used to match media content. Audio channel data is used to generate audio fingerprints. Video channel data is used to generate a video fingerprints. Multi-channel fingerprints can then be generated based on the audio channel fingerprints and video channel fingerprints. In this sense, entropy can be increased while the multi-channel fingerprint can be less resistant to noise.

22 Claims, 14 Drawing Sheets

MULTI-CHANNEL AUDIO VIDEO FINGERPRINTING

CROSS-REFERENCE TO RELATED APPLICATIONS

This application is a continuation of U.S. patent application Ser. No. 14/019,086 filed on Sep. 5, 2013, which is incorporated by reference in its entirety.

TECHNICAL FIELD

This application relates to matching of audio content and video content and more particularly to using multi-channel fingerprinting.

BACKGROUND

Audio matching provides for identification of a recorded audio sample (e.g., an audio track of a video) by comparing the audio sample to a set of reference samples. To make the comparison, an audio sample can be transformed to a time-frequency representation (e.g., by employing a short time Fourier transform). Using a time-frequency representation, interest points that characterize time and frequency locations of peaks or other distinct patterns of a spectrogram can be extracted from the audio sample. Audio fingerprints can be computed as functions of sets of interest points. Audio fingerprints of the audio sample can then be compared to audio fingerprints of reference samples to determine identity of the audio sample.

Video matching works similarly to audio matching in that it provides for identification of a recorded video sample by comparing video frames features of the video sample to a set of reference video features related to a set of reference videos. To make the comparison, a set of mean frames of the video sample can be identified based on a sliding time window over the video sample. Unique video features based on the set of mean frames can then be identified. Video fingerprints can be generated based on unique video features identified through the mean frames. Video fingerprints of the video sample can then be compared to video fingerprints of reference videos to determine identity of the video sample.

In some content matching systems, it is desirable to identify strictly audiovisual matches, e.g., matches that occur on both the audio channel and video channel. In most audiovisual content matching systems, audio and video channels are treated independently, using different fingerprints and matching steps, and then merging results from the audio matching process and the video matching process to determine an audiovisual match.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, an input component receives audio channel data and video channel data associated with a video. A spectrogram component generates an audio spectrogram based on the audio channel data. A single channel fingerprint component generates a set of audio fingerprints based on the audio spectrogram and a set of video fingerprints based on the video channel data. A multi-channel fingerprint component generates a set of multi-channel fingerprints based on the set of audio fingerprints and the set of video fingerprints.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
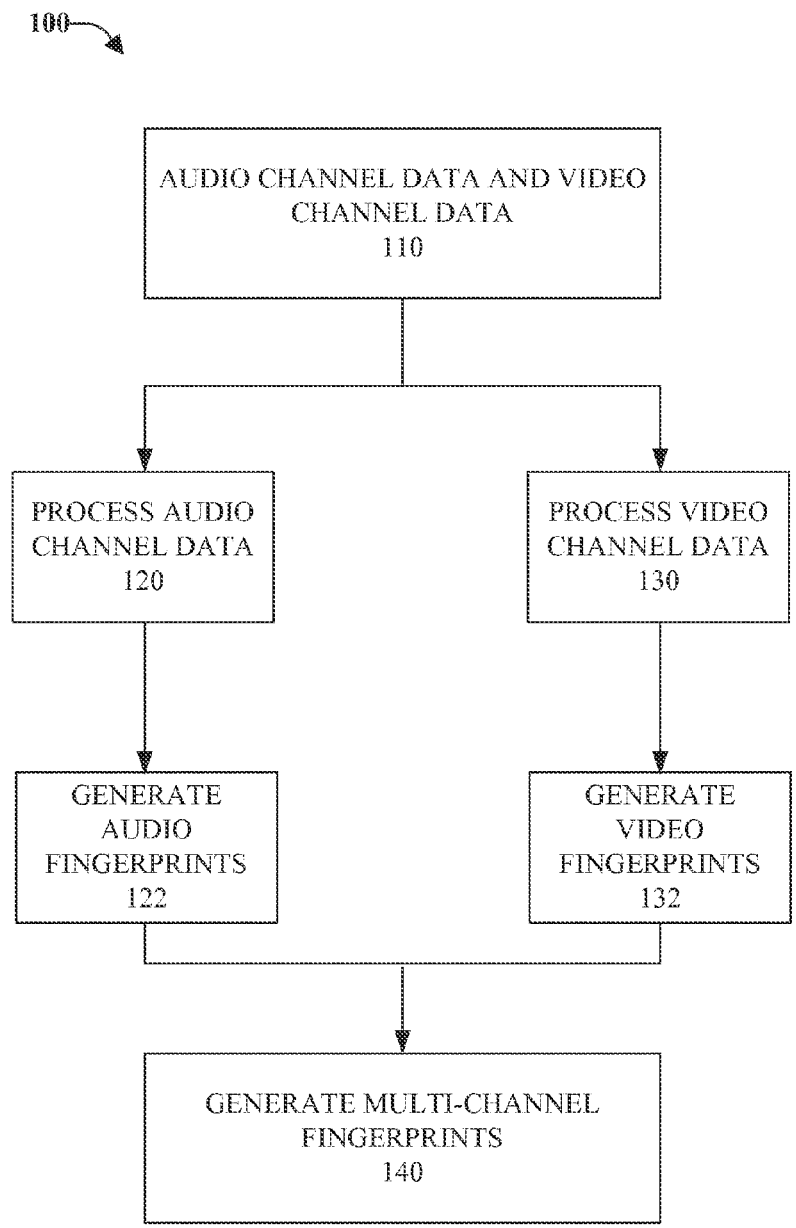
FIG. 1 illustrates an example block diagram representing processing audio channel data and video channel data to generate multi-channel fingerprints.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Referring now to FIG. 1, there is illustrated an example block diagram representing processing audio channel data and video channel data to generate multi-channel fingerprints. First, at 110, audio channel data and video channel data associated with a video can be received.

At 120, audio channel data can be processed. Audio matching in general involves analyzing an audio sample for unique characteristics that can be used in comparison to unique characteristics of reference samples to identify the audio sample. As a starting point for this analysis, a spectrogram of the audio signal is constructed; the spectrogram represents an audio sample by plotting time on one axis and frequency on another axis. Amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at a specific frequency over time. The audio sample can be run through additional filters to individually isolate a set of frequencies to measure amplitude of the set over time. A spectrogram can be created by combining respective measurements over time on a frequency axis to generate a spectrogram image of frequency amplitudes over time.

A second technique involves using a short-time Fourier transform ("STFT") to break down an audio sample into time windows, where respective windows are Fourier transformed to calculate magnitude of a frequency spectrum for the duration of each window. Combining a plurality of windows side by side on a time axis of the spectrogram creates an image of frequency amplitudes over time. Other techniques, such as wavelet transforms, can also be employed to construct a spectrogram.

In one implementation, at 122, the spectrogram of an audio sample can be processed into fingerprints through determining interest points that characterize time and frequency locations of peaks or other distinct patterns of the spectrogram. Descriptors can be computed as functions of sets of interest points. A set of descriptors can constitute an audio fingerprint for an audio sample. It can be appreciated that there are many possible methods for selecting interest points within the spectrogram and incorporating interest points within a descriptor. For example, frequency ratios between multiple interest points can be used as descriptors as a means to be more robust to pitch shift distortions. In another example, interest points generated from the spectrogram can be pruned to select interest points which are most robust to pitch and time distortions. In another example, the density of interest points at high or low frequency bands can be adjusted to increase accuracy in matching.

In one implementation, after generating a set of interest points, a set of pairs can then be generated wherein each pair in the set of pairs contains an anchor interest point and a paired interest. A third point can then be generated for each pair in the set of pairs based on a search path wherein the third point is a time/frequency point of a maxima along the search path. After generating the three points, an audio descriptor can be generated using time and frequency information related to the anchor point, the paired point, the third point, and an additional bit which relates to whether the third point is on the first half of the search path or the second half of the search path. For example, if the third point is on the first half of the search path, the bit can be a "0", if the third point is on the second half of the search path, the bit can be a "1". For example, an audio descriptor can encompass five values: (1) a quantized frequency of the anchor point; (2) a first quantized frequency ratio of the frequency of the paired point and the frequency of the anchor point; (3) a second quantized frequency ratio of the frequency of the third point and the frequency of the anchor point; (4) a time span between the anchor interest point and the paired interest point; and (5) the binary bit associated with where on the search path the third point was found. In quantizing the frequency of the anchor point, it can be appreciated that pitch shifts can alter interest points more in high frequencies; therefore, logarithmic sized bins can be used that create larger bins in high frequencies.

In another implementation, at 122, the spectrogram of an audio sample can be processed through extracting wavelets from the spectrogram. The top wavelets according to their magnitude can be specifically extracted as wavelet vectors. From individual wavelet vectors, a min-hash can be used to generate a subfingerprint. A set of min-hashes or subfingerprints can be used as an audio fingerprint. It can be appreciated that by using min-hashes, the size of the wavelets can be reduced to a much more compact min-hash. In one implementation, the spectrogram can be downscaled to a lower resolution before generating the min-hashes. It can be appreciated that a downscaled spectrogram can be more resistant to pitch variations in matching.

At 130, video fingerprints can be generated in a similar manner to that of the audio fingerprints. A mean video frame can be determined from dynamically sliding a static sized time window over the video. For example, a sliding four second time window can be used where the mean value of all frames within the sliding time window is determined.

In one implementation, at 132, the mean frame of the sliding time window can be used as an input in generating wavelet signatures. For each mean frame image, a wavelet signature of the image can be generated. A wavelet signature can be a quantized version of the wavelet decomposition of the mean image. Similar to the wavelet generated when determining audio fingerprints, the wavelet signatures can used to generate a min-hash or subfingerprint. A set of min-hashes or subfingerprints can be used as a video fingerprint.

In another implementation, at 132, interest points can be detected from the mean frame of the sliding time window, for example, using Laplacian of Gaussian techniques, using scale invariant feature transforms, using speeded-up robust features, etc. Sets of interest points related to a mean frame can form a video descriptor. Sets of video descriptors related to a video sample can form a video fingerprint. Video descriptors can be quantized using vector quantization, and in some implementations, other information can be included within the video descriptor such as quantized position.

At 140, multi-channel fingerprints can be generated. In one implementation, wavelet based min-hash audio fingerprints and wavelet based min-hash video fingerprints can be combined to form a multi-channel fingerprint. One way to combine the wavelet based min-hash fingerprints is to merge them. To merge the fingerprints, a consistent output rate can be used for both the audio channel and video channel. For example, each output rate for fingerprint generation can generate 100 min-hashes every 100 ms. Once a consistent output rate is established, min-hashes of the audio fingerprint and min-hashes of the video fingerprint can be concatenated to create a min-hash based multi-channel fingerprint. For example, min-hash 0 from the audio fingerprint is concatenated with min-hash 0 from the video fingerprint to create a single audio-visual similarity hash. A set of audio-visual similarity hashes can constitute a multi-channel fingerprint.

In another implementation, wavelet based min-hash fingerprints can be combined using a weighted min-hasher. Audio min-hash based fingerprints and video min-hash based fingerprints can be aggregated as weighted min-hashes over a time window of audiovisual content. Each min-hash can be combined with a channel index, for example, 0 for audio, and 1 for video. The set of min-hashes is then provided as input to a weighted min-hasher to generate a number of weighted min-hashes. Pairs of output hashes can then be concatenated. It can be appreciated that more than 2 output hashes can be concatenated, e.g., 4, 6, etc. It can be further appreciated that some of the concatenated pairs can correspond to audio-only, video-only, or audiovisual features. In one implementation, all pairs can correspond to both audio and video. For example, the first audio weighted min-hash and the first video weighted min-hash can be paired; the second audio weighted min-hash and the second video weighted min-hash can be paired, etc.

Alternatively, at 140, descriptor point based fingerprints can be combined into multi-channel fingerprints. It can be appreciated that it is important that descriptor based fingerprints are combined in a way which is consistent. One way to ensure consistency is to combine all pairs of audio descriptors and video descriptors at the same time offset, or to combine a video descriptors with the audio descriptor or descriptors which are positioned closest in time. For example, video interest points which are found at a time t=300 s could be combined with the closest audio interest points which may be position at time t=299 s. As another example, video is typically recorded at 30 frames per second however audio may be sampled every 10 ms or 20 ms. Thus, there may be multiple audio descriptors timed most closely to the same video descriptor. In addition, multiple descriptors can be generated for the same time period.

One way to create unique pairs of audio descriptors and video descriptors when multiple descriptors are generated for the same time period is through the use of spatial information. For example, for video descriptors a 2-dimensional frame will exist for each time slice but for audio descriptors there will be a 1-dimensional spectrogram slice. If the y-axis of the audio or video features are scaled to be consistent with that of the other channel, audio descriptors and video descriptors can be combined based on selecting the "N" (where "N" is an integer) closest descriptors on the y-axis.

Figure 2:
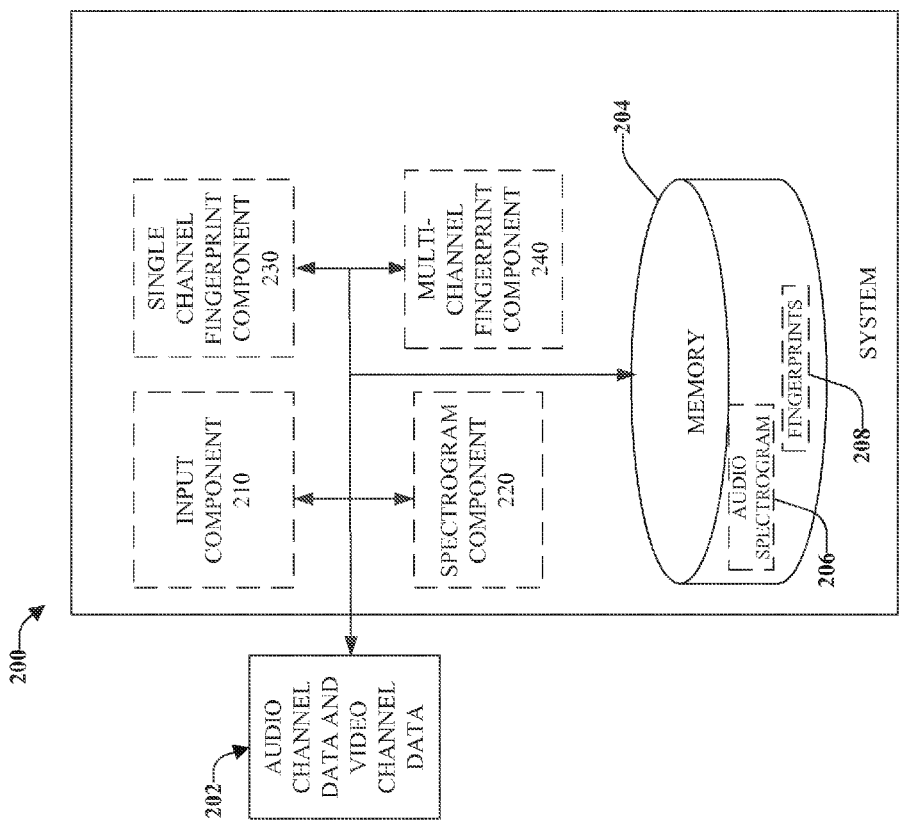
FIG. 2 illustrates a high-level functional block diagram of an example system in accordance with implementations of this disclosure.

Referring now to FIG. 2, there is illustrated a high-level functional block diagram of an example system in accordance with implementations of this disclosure. In FIG. 2, system 200 includes an input component 210, a spectrogram component 220, a single channel fingerprint component 230, a multi-channel fingerprint component 240, and a memory 204, each of which may be coupled as illustrated. An input component 210 can receive audio channel data and video channel data 202 associated with a video (e.g., a video file, a video clip, a video sample, etc.). For example, the input component 210 can receive an audio track (e.g., a music track, an audio recording, etc.) and image data (e.g., one or more image frames) for the video. In an aspect, an audio track can be embedded in the video (e.g., the video file). In one example, video can be video content uploaded by a user (e.g., a user of a media sharing platform). It is to be appreciated that the audio channel data and the video channel data (e.g., the video) can be in any recognizable video file format (e.g., audio file format and/or image file format), codec compression format, etc.

Spectrogram component 220 can generate an audio spectrogram 206 based on the audio channel data. For example, the audio spectrogram 206 can represent the audio channel data by plotting time on one axis and frequency on another axis. Additionally, amplitude or intensity of a certain frequency at a certain time can also be incorporated into the audio spectrogram 206 by using color or a third dimension. In an aspect, the audio spectrogram 206 can be generated based at least in part on a series of band-pass filters. For example, a series of band-pass filters can filter the audio channel data at one or more specific frequencies and measure amplitude of the audio channel data at that specific frequency over time. Additionally, the audio channel data can be processed through one or more additional filters to individually isolate a set of frequencies to measure the amplitude of the set over time. As such, the audio spectrogram 206 can be generated by combining respective measurements over time on a frequency axis to generate a spectrogram image of frequency amplitudes over time.

In another aspect, the audio spectrogram 206 can be generated based at least in part on a short-time Fourier transform ("STFT"). For example, the spectrogram component 220 can partition the audio channel data into one or more time windows. Accordingly, the spectrogram component 220 can process each of the one or more time windows (e.g., the audio channel data) based at least in part on a STFT. For example, each of the one or more time windows can be Fourier transformed to calculate a magnitude of the frequency spectrum for the duration of each window. As such, an image of frequency amplitudes over time can be generated by combining a plurality of windows side by side on the time axis of the audio spectrogram 206. It is to be appreciated that other techniques, such as wavelet transforms, can also be used to construct the audio spectrogram 206. Audio spectrogram 206 can be stored within memory 204 for access by other components. In one implementation, spectrogram component 220 generates a downscaled audio spectrogram based on the audio spectrogram 206.

Single channel fingerprint component 230 can generate a set of audio fingerprints based on the audio channel data (e.g., the audio spectrogram 206). Additionally or alternatively, the single channel fingerprint component 230 can generate a set of video fingerprints based on the video channel data. The set of audio fingerprints and/or the set of video fingerprints can be indexed in a variety of available formats (e.g., a hash index). The set of audio fingerprints and/or the set of video fingerprints can be a time series of strings. Each string can include a plurality of bytes (e.g., 100 bytes). A string can represent a portion of the audio channel data and/or the video channel data around a certain time period of the audio channel data and/or the video channel data (e.g., between 400 milliseconds and 600 milliseconds of the audio channel data and/or the video channel data).

In an aspect, the single channel fingerprint component 230 can generate the set of audio fingerprints and/or the set of video fingerprints based at least in part on a hash technique (e.g., fingerprints in the set of audio fingerprints and/or the set of video fingerprints can be min-hashes). For example, the set of audio fingerprints can be generated based at least in part on a hash of a spectrogram window (e.g., a min-hash technique) of the audio spectrogram 206. Additionally or alternatively, the set of video fingerprints can be generated based in part on a hash of a window (e.g., a min-hash technique) associated with the video channel data. In one example, the single channel fingerprint component 230 can implement a locality sensitive hashing (LSH) scheme to generate the set of audio fingerprints and/or the set of video fingerprints. For example, the LSH scheme can implement a random hashing scheme. In an example, the single channel fingerprint component 230 can implement a min-hash (e.g., weighted min-hash, a min-wise independent permutation, etc.). As such, the single channel fingerprint component 230 can be implemented to generate the set of audio fingerprints and/or the set of video fingerprints based on a hashing scheme. It is to be appreciated that the single channel fingerprint component 230 can implement other types of hashing schemes. Therefore, a combination of computer vision techniques and/or data stream processing algorithms can be implemented to generate the set of audio fingerprints and/or the set of video fingerprints. In another aspect, set of audio fingerprints and/or the set of video fingerprints can be generated based at least in part on wavelets (e.g., one or more wavelet vectors). In one implementation, single channel fingerprint component 230 generates the set of audio fingerprints based on the downscaled audio spectrogram (e.g., based on the audio spectrogram 206).

The set of audio fingerprints and the set of video fingerprints can include the same data rate (e.g., the same tempo). As such, the multi-channel fingerprint component 240 can generate a set of multi-channel fingerprints based on the set of audio fingerprints and the set of video fingerprints. For example, the multi-channel fingerprint component 240 can combine (e.g., merge) the set of audio fingerprints and the set of video fingerprints to generate a set of multi-channel fingerprints. The set of multi-channel fingerprints can include the same data rate (e.g., the same tempo) as the set of audio fingerprints and the set of video fingerprints. A partition (e.g., a segment, sub-fingerprint, etc.) of the set of multi-channel fingerprints can be generated as a function of a corresponding partition (e.g., segment, sub-fingerprint, etc.) of the set of audio fingerprints and the set of video fingerprints.

In an aspect, the multi-channel fingerprint component 240 can generate the set of multi-channel fingerprints based at least in part on a hash (e.g., a min-hash). For example, the multi-channel fingerprint component 240 can select a corresponding partition from the set of audio fingerprints and the set of video fingerprints based at least in part on a hash (e.g., locality sensitive hash). In one example, the multi-channel fingerprint component 240 can select a corresponding partition from the set of audio fingerprints and the set of video fingerprints based at least in part on a random number generator (e.g., a locality sensitive hashing scheme that implements a random number generator). The values generated by the random number generator can be repeatable. In another example, another hashing scheme (e.g., a weighted hashing scheme) can be implemented to select a corresponding a corresponding partition from the set of audio fingerprints and the set of video fingerprints. In yet another example, wavelet based min-hash audio fingerprints (e.g., the set of audio fingerprints) and wavelet based min-hash video fingerprints (e.g., the set of video fingerprints) can be combined to form the set of multi-channel fingerprints.

In an aspect, the single channel fingerprint component 230 can determine individual interest points that identify unique characteristics (e.g., time locations, frequency locations, patterns, etc.) of the audio channel data (e.g., the audio spectrogram 206) and/or the video channel data. As such, the set of audio fingerprints and/or the set of video fingerprints can be computed as a function of a set of interest points. In one example, the single channel fingerprint component 230 can generate a set of descriptors computed as a function of a set of interest points. A set of descriptors can constitute an audio fingerprint for the audio channel data and/or a video fingerprint for the video channel data. For example, a set of descriptors can be associated with frequency ratios between multiple interest points. In one example, one or more interest points can be removed from a set of interest points to select interest points which are most robust to pitch and/or time distortions. In another example, density of interest points at high or low frequency bands can be adjusted to increase accuracy. The single channel fingerprint component 230 can generate a set of audio descriptors for the set of audio fingerprints and/or a set of video descriptors for the set of video fingerprints.

In another aspect, the multi-channel fingerprint component 240 can generate the set of multi-channel fingerprints based at least in part on a set of descriptors associated with the set of audio fingerprints and/or the set of video fingerprints. For example, a set of audio descriptors associated with the set of audio fingerprints and a set of video descriptors associated with the set of video fingerprints can be combined at the same time offset. In another example, audio descriptor(s) from the set of audio descriptors can be combined with video descriptor(s) from the set of video descriptors that are within a certain time interval (e.g., audio descriptor(s) from the set of audio descriptors can be combined with video descriptor(s) from the set of video descriptors that are positioned closest in time). In a non-limiting example, video descriptor(s) which are found at a time t=300 s could be combined with the closest audio descriptors(s) which may be position at time t=299 s. In one example, multiple audio descriptors can be combined with a singe video descriptor. Furthermore, multiple audio descriptors and/or video descriptors can be generated for a certain time offset. In an aspect, the multi-channel fingerprint component 240 can generate the set of multi-channel fingerprints based at least in part on spatial information associated with a set of descriptors. For example, the set of audio fingerprints can be associated with a 1-dimensional spectrogram slice and the set of video fingerprints can be associated with a 2-dimensional spectrogram slice. As such, a y-axis associated with the set of audio descriptors can be scaled to the set of video descriptors (or a y-axis associated with the set of video descriptors can be scaled to the set of audio descriptors). Therefore, audio descriptor(s) and/or video descriptor(s) can be combined by selecting the closest descriptor(s) on the scaled y-axis. Audio fingerprints, video fingerprints and/or multi-channel fingerprints (e.g., Fingerprints 208) can be stored within memory 204 for access by other components.

Figure 3:
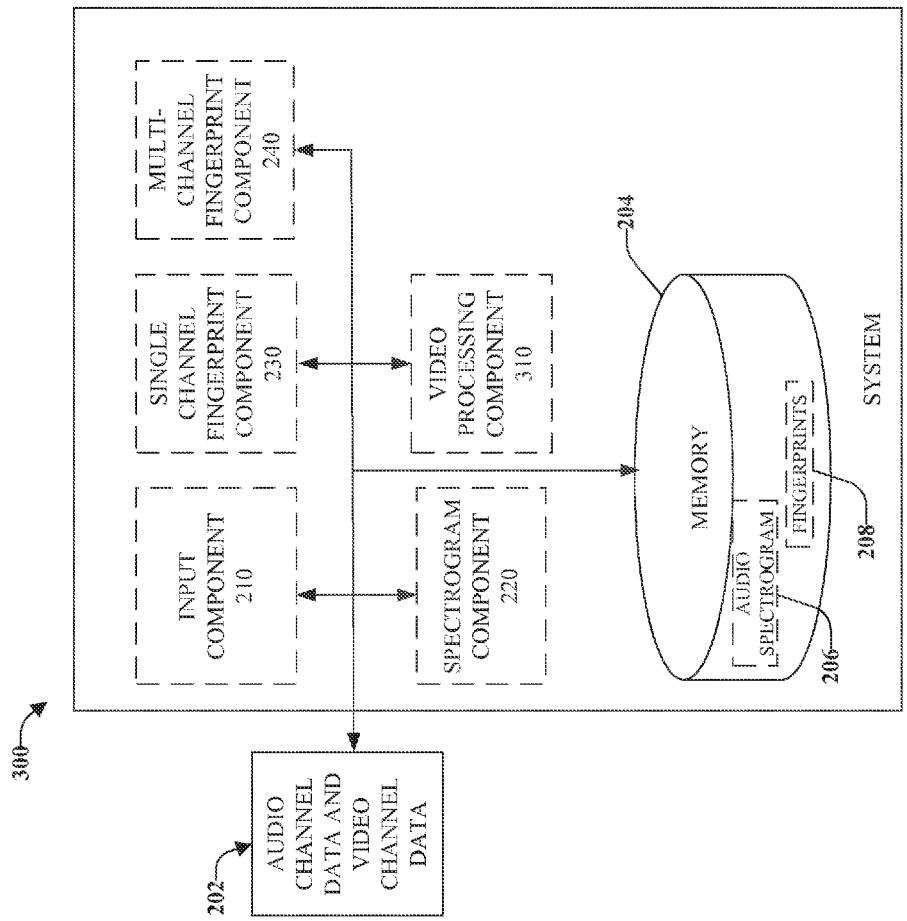
FIG. 3 illustrates a high-level functional block diagram of an example system including a video processing component in accordance with implementations of this disclosure.

Referring now to FIG. 3, there is illustrated a high-level functional block diagram of an example system including a video processing component 310 in accordance with implementations of this disclosure. Video processing component 310 can generate a set of mean frames based on a sliding time window and the video channel data. For example, the video channel data can be partition the video channel data based on a sliding time window. The sliding time window can be a certain time interval (e.g., a localized time interval) of video. In one example, the sliding time window can be a four second window of video. In an aspect, the video processing component 310 can generate the set of mean frames based at least in part on a STFT. In another aspect, the video processing component 310 can implement a Fourier transform to calculate a magnitude of a frequency spectrum for the duration of the sliding time window. In one implementation, single channel fingerprint component 230 can generate a set of wavelet min-hashes based on the set of mean frames. In one implementation, single channel fingerprint component 230 can generate the set of video fingerprints based on the set of wavelet min-hashes. In one implementation, video fingerprints in the set of video fingerprints are min-hashes.

In one implementation, multi-channel fingerprint component 240 can generate the set of multi-channel fingerprints based on concatenating min-hashes of audio fingerprints from the set of audio fingerprints and min-hashes of video fingerprints from the set of video fingerprints. In one implementation, multi-channel fingerprint component 240 generates the set of multi-channel fingerprints based on a consistent output rate.

In one implementation, single channel fingerprint component 230 can generate a set of weighted audio min-hashes based on the set of audio fingerprints, an aggregate hash time window, and an audio channel identifier. Single channel fingerprint component 230 can also generate a set of weighted video min-hashes based on the set of video fingerprints, the aggregate hash time window, and a video channel identifier. Multi-channel fingerprint component 240 can then generate a set of concatenated pairs based on the set of weighted audio min-hashes and the set of weighted video min-hashes. Also, multi-channel fingerprint component 240 can generate the set of multi-channel fingerprints based on the set of concatenated pairs.

In one implementation, concatenated pairs in the set concatenated pairs are comprised of at least one weighted audio min-hash from the set of weighted audio min-hashes and at least one weighted video min-hash from the set of weighted video min-hashes.

Figure 4:
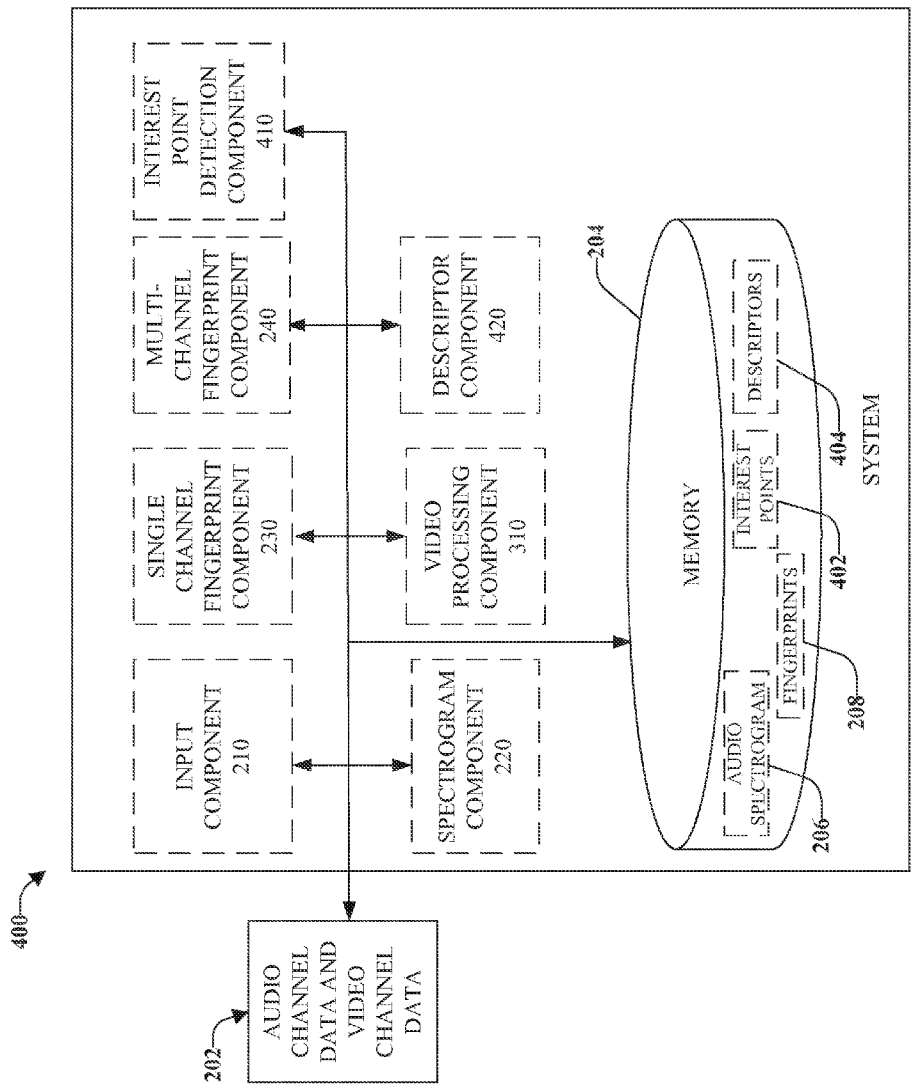
FIG. 4 illustrates a high-level functional block diagram of an example system including interest point detection and descriptor components in accordance with implementations of this disclosure.

Referring now to FIG. 4, there is illustrated a high-level functional block diagram of an example system including interest point detection component 410 and descriptor component 420 in accordance with implementations of this disclosure. Interest point detection component 410 can generate a set of interest points (e.g., a set of audio interest points) based on the audio spectrogram 206. The set of audio interest points can identify unique characteristics of the audio spectrogram. For example, the set of audio interest points can identify time locations, frequency locations, patterns, etc. located in the audio spectrogram 206. In one example, the set of audio interest points can be determined based on a Laplacian detection technique. In another example, the set of audio interest points can be determined based on a Gaussian detection technique. In an aspect, the set of audio descriptors can be associated with one or more frequency ratios between multiple audio interest points.

Descriptor component 420 can generate a set of descriptors (e.g., a set of audio descriptors) based on the set of audio interest points wherein the single channel fingerprint component generates the set of audio fingerprints based on the set of descriptors. In another aspect, the set of audio descriptors can be associated with a density value associated with the set of audio interest points. In yet another aspect, the set of audio descriptors can be quantized using vector quantization. In one example, the set of audio descriptors can include quantized position information associated with the set of audio interest points.

In one implementation, interest point detection component 410 can generate a set of video interest points based on the set of mean frames. In one implementation, interest point detection component 410 can generate a set of quantized video interest points based on the set of video interest points. In one implementation, single channel fingerprint component 230 can generate the set of video fingerprints based on the set of quantized video interest points. The set of video interest points can identify unique characteristics of the video channel data (e.g., the set of mean frames). For example, the set of video interest points can identify time locations, frequency locations, patterns, etc. located in the video channel data (e.g., the set of mean frames). In one example, the set of video interest points can be determined based on a Laplacian detection technique. In another example, the set of video interest points can be determined based on a Gaussian detection technique.

Descriptor component 420 can generate a set of descriptors (e.g., a set of video descriptors) based on the set of video interest points. In one aspect, the set of video descriptors can be associated with a density value associated with the set of video interest points. In another aspect, the set of video descriptors can be quantized using vector quantization. In one example, the set of video descriptors can include quantized position information associated with the set of video interest points.

In one implementation, multi-channel fingerprint component 240 can generate the set of multi-channel fingerprints by combining an audio fingerprint from the set of audio fingerprints and a video fingerprint from the set of video fingerprints based on at least one of a common time offset, a closest in time offset, and a spatial similarity. The set of audio interest points and/or the set of video interest points (e.g., interest points 402) can be stored in the memory 204. Additionally, the set of audio descriptors and/or the set of video descriptors (e.g., descriptors 404) can be stored in the memory 204.

Figure 5:
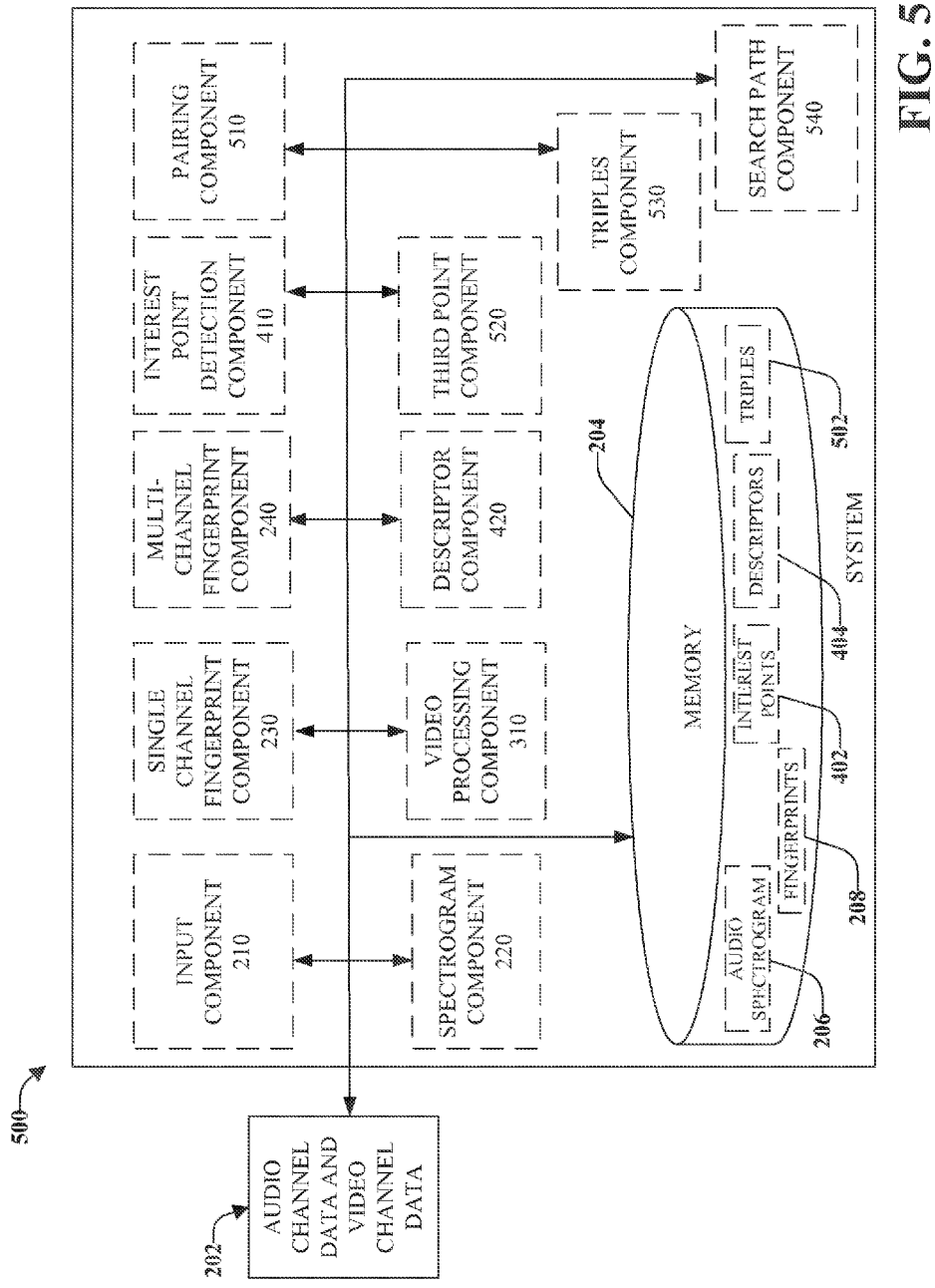
FIG. 5 illustrates a high-level functional block diagram of an example system including pairing, third point, triples and search path components in accordance with implementations of this disclosure.

Referring now to FIG. 5, there is illustrated a high-level functional block diagram of an example system including pairing, third point, triples and search path components in accordance with implementations of this disclosure.

Pairing component 510 can generate a set of pairs wherein each pair in the set of pairs contains an anchor interest point (e.g., an anchor audio interest point and/or a anchor video interest point) and a paired interest point (e.g., a paired audio interest point and/or a paired video interest point). Third point component 520 can generate a third point for each pair in the set of pairs based on a search path wherein the third point is a time/frequency point of a maxima along the search path. Triples component 530 can generate a set of triples wherein respective triples in the set of triples contain the anchor interest point, the paired interest point and the third point. Search path component 540 can determine a binary bit associated with the triple based on whether the third point lies on a first half of the search path or a second half of the search path.

In one implementation, descriptor component 420 can generate descriptors in the set of descriptors (e.g., the set of audio descriptors and/or the set of video descriptors) based on triples in the set of triples and contain a quantized frequency of the anchor interest point, a first quantized frequency ratio of a frequency of the paired interest point and a frequency of the anchor interest point, a second quantized frequency ratio of a frequency of the third point and the frequency of the anchor interest point, a time span between the anchor interest point and the paired interest point, and the binary bit associated with the triple. The set of triples (e.g., triples 502) can be stored in the memory 204.

FIGS. 6-12 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 6:
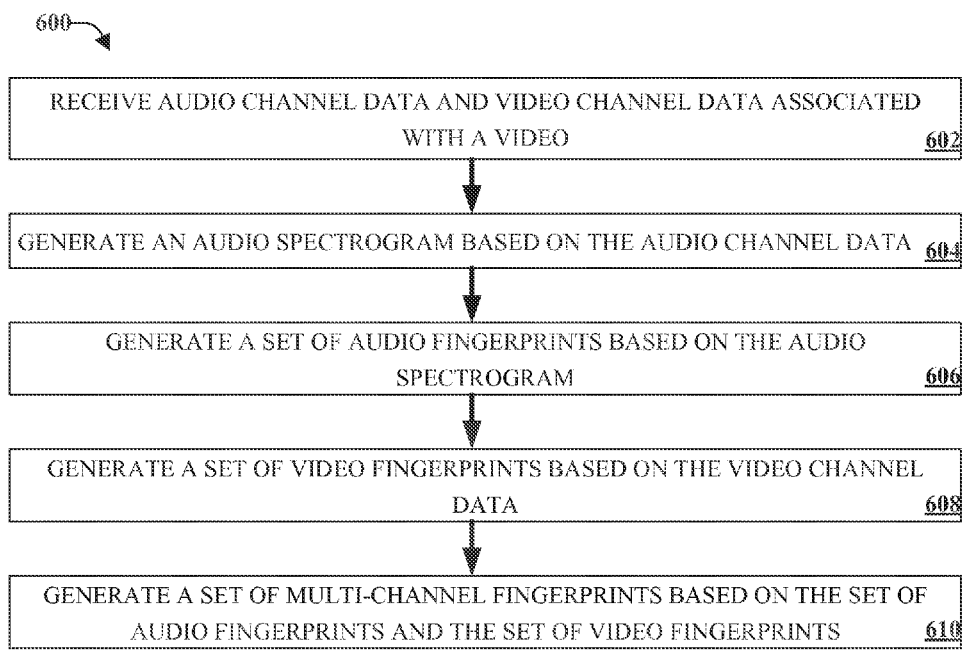
FIG. 6 illustrates an example method for generating multi-channel fingerprints in accordance with implementations of this disclosure.

FIG. 6 illustrates an example method for generating multi-channel fingerprints in accordance with implementations of this disclosure. At 602, audio channel data and video channel data associated with a video can be received. For example, an audio track (e.g., a music track, an audio recording, etc.) and image data (e.g., one or more image frames) for a video can be received. In an aspect, an audio track (e.g., the audio channel data) can be embedded in the video (e.g., the video channel data). In one example, video can be video content uploaded by a user (e.g., a user of a media sharing platform). It is to be appreciated that the audio channel data and the video channel data (e.g., the video) can be in any recognizable video file format (e.g., audio file format and/or image file format), codec compression format, etc.

At 604, an audio spectrogram can be generated based on the audio channel data. In an aspect, the audio spectrogram can be generated based at least in part on a series of band-pass filters. For example, a series of band-pass filters can filter the audio channel data at one or more specific frequencies and/or measure amplitude of the audio channel data at that specific frequency over time. Additionally, the audio channel data can be processed through one or more additional filters to individually isolate a set of frequencies to measure the amplitude of the set over time. In another aspect, the audio spectrogram can be generated based at least in part on a STFT. For example, an STFT can be implemented to partition the audio channel data into one or more time windows. Each window can be Fourier transformed to calculate a magnitude of the frequency spectrum for the duration of each window. In yet another aspect, the audio spectrogram can be generated based on one or more wavelet transforms.

At 606, a set of audio fingerprints can be generated based on the audio spectrogram. The set of audio fingerprints can be a time series of strings. Each string can include a plurality of bytes (e.g., 100 bytes). A string can represent a portion of the audio channel data around a certain time period of the audio channel data (e.g., between 400 milliseconds and 600 milliseconds of the audio channel data). The set of audio fingerprints can be indexed in a variety of available formats (e.g., a hash index). In an aspect, the set of audio fingerprints can be generated based at least in part on a hash technique (e.g., a min-hash technique, a LSH scheme, a weighted min-hash scheme, etc.). In an aspect, the set of audio fingerprints can be generated based at least in part on a hash of a spectrogram window of the audio spectrogram.

At 608, a set of video fingerprints can be generated based on the video channel data. The set of video fingerprints can be a time series of strings. Each string can include a plurality of bytes (e.g., 100 bytes). A string can represent a portion of the video channel data around a certain time period of the video channel data (e.g., between 400 milliseconds and 600 milliseconds of the video channel data). The set of video fingerprints can be indexed in a variety of available formats (e.g., a hash index). In an aspect, the set of video fingerprints can be generated based at least in part on a hash technique (e.g., a min-hash technique, a LSH scheme, a weighted min-hash scheme, etc.). The set of audio fingerprints and the set of video fingerprints can include the same data rate (e.g., the same tempo).

At 610, a set of multi-channel fingerprints can be generated based on the set of audio fingerprints and the set of video fingerprints. For example, the set of audio fingerprints and the set of video fingerprints can be combined (e.g., merged) to generate a set of multi-channel fingerprints. The set of multi-channel fingerprints can include the same data rate (e.g., the same tempo) as the set of audio fingerprints and the set of video fingerprints. A partition (e.g., a segment, sub-fingerprint, etc.) of the set of multi-channel fingerprints can be generated as a function of a corresponding partition (e.g., segment, sub-fingerprint, etc.) of the set of audio fingerprints and the set of video fingerprints.

In an aspect, the set of audio fingerprints and the set of video fingerprints can be combined (e.g., merged) based at least in part on a hash (e.g., a min-hash, a locality sensitive hash, a weighted hash, a wavelet based min-hash) to generate the set of multi-channel fingerprints. In another aspect, the set of audio fingerprints and the set of video fingerprints can be combined (e.g., merged) based at least in part on a random number generator to generate the set of multi-channel fingerprints. In yet another aspect, the set of audio fingerprints and the set of video fingerprints can be combined (e.g., merged) based at least in part on a set of interest points (e.g., as set of audio interest points and/or a set of video interest points) and/or a set of descriptors (e.g. as set of audio descriptors and/or a set of video descriptors) to generate the set of multi-channel fingerprints.

Figure 7:
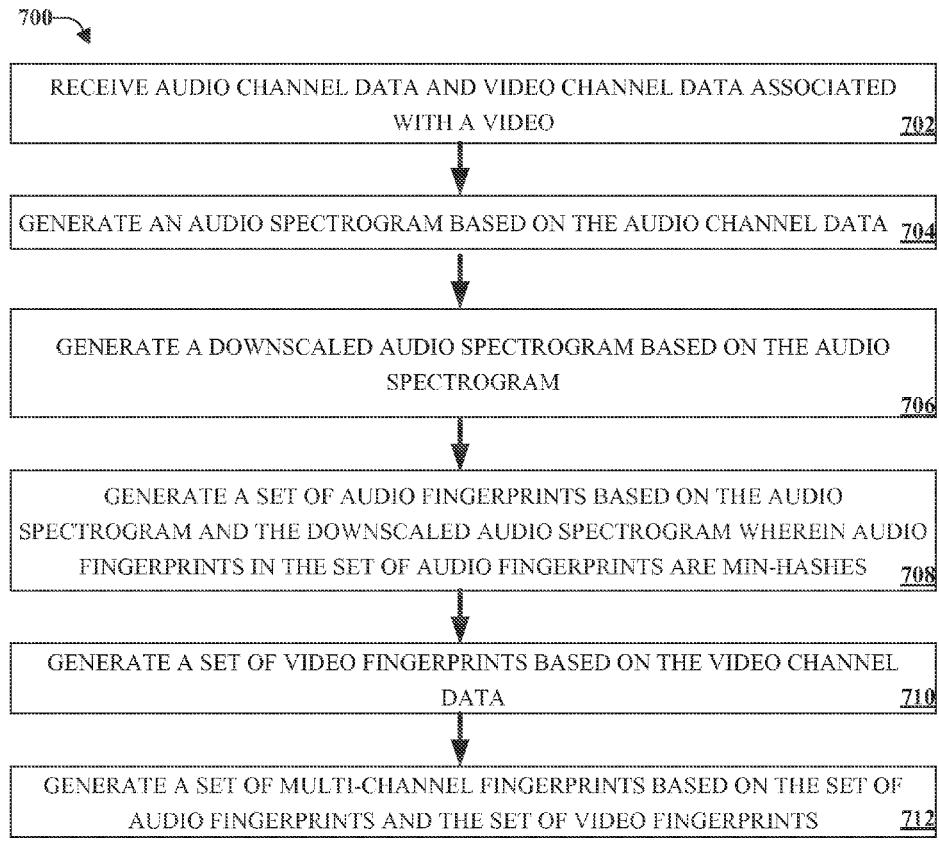
FIG. 7 illustrates an example method for generating multi-channel fingerprints including generating a downscaled spectrogram in accordance with implementations of this disclosure.

FIG. 7 illustrates an example method for generating multi-channel fingerprints including generating a downscaled spectrogram in accordance with implementations of this disclosure. At 702, audio channel data and video channel data associated with a video can be received. At 704, an audio spectrogram can be generated based on the audio channel data. At 706, a downscaled audio spectrogram can be generated based on the audio spectrogram. At 708, a set of audio fingerprints can be generated based on the audio spectrogram and the downscaled audio spectrogram wherein audio fingerprints in the set of audio fingerprints are min-hashes. At 710, a set of video fingerprints can be generated based on the video channel data. At 712, a set of multi-channel fingerprints can be generated based on the set of audio fingerprints and the set of video fingerprints.

Figure 8:
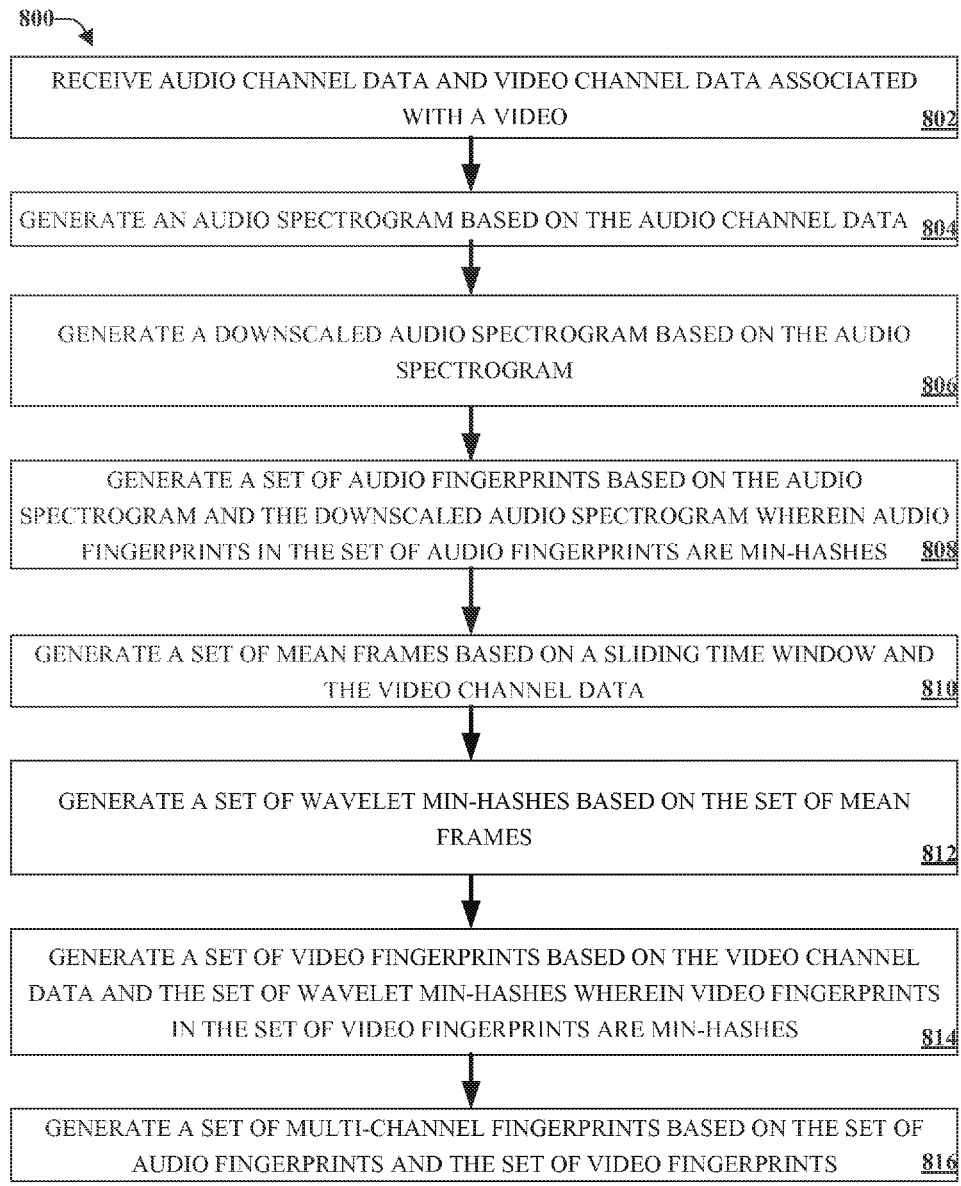
FIG. 8 illustrates an example method for generating multi-channel fingerprints including further processing video channel data in accordance with implementations of this disclosure.

FIG. 8 illustrates an example method for generating multi-channel fingerprints including further processing video channel data in accordance with implementations of this disclosure. At 802, audio channel data and video channel data associated with a video can be received. At 804, an audio spectrogram can be generated based on the audio channel data. At 806, a downscaled audio spectrogram can be generated based on the audio spectrogram. At 808, a set of audio fingerprints can be generated based on the audio spectrogram and the downscaled audio spectrogram wherein audio fingerprints in the set of audio fingerprints are min-hashes.

At 810, a mean set of frames can be generated based on a sliding time window and the video channel data. At 812, a set of wavelet min-hashes can be generated based on the set of mean frames. At 814, a set of video fingerprints can be generated based on the video channel data and the set of wavelet min-hashes wherein video fingerprints in the set of video fingerprints are min-hashes. At 816, a set of multi-channel fingerprints can be generated based on the set of audio fingerprints and the set of video fingerprints. In one implementation, generating the set of multi-channel fingerprints is based on concatenating min-hashes of audio fingerprints from the set of audio fingerprints and min-hashes of video fingerprints from the set of video fingerprints. In one implementation, generating the set of multi-channel fingerprints is based on a consistent output rate.

Figure 9:
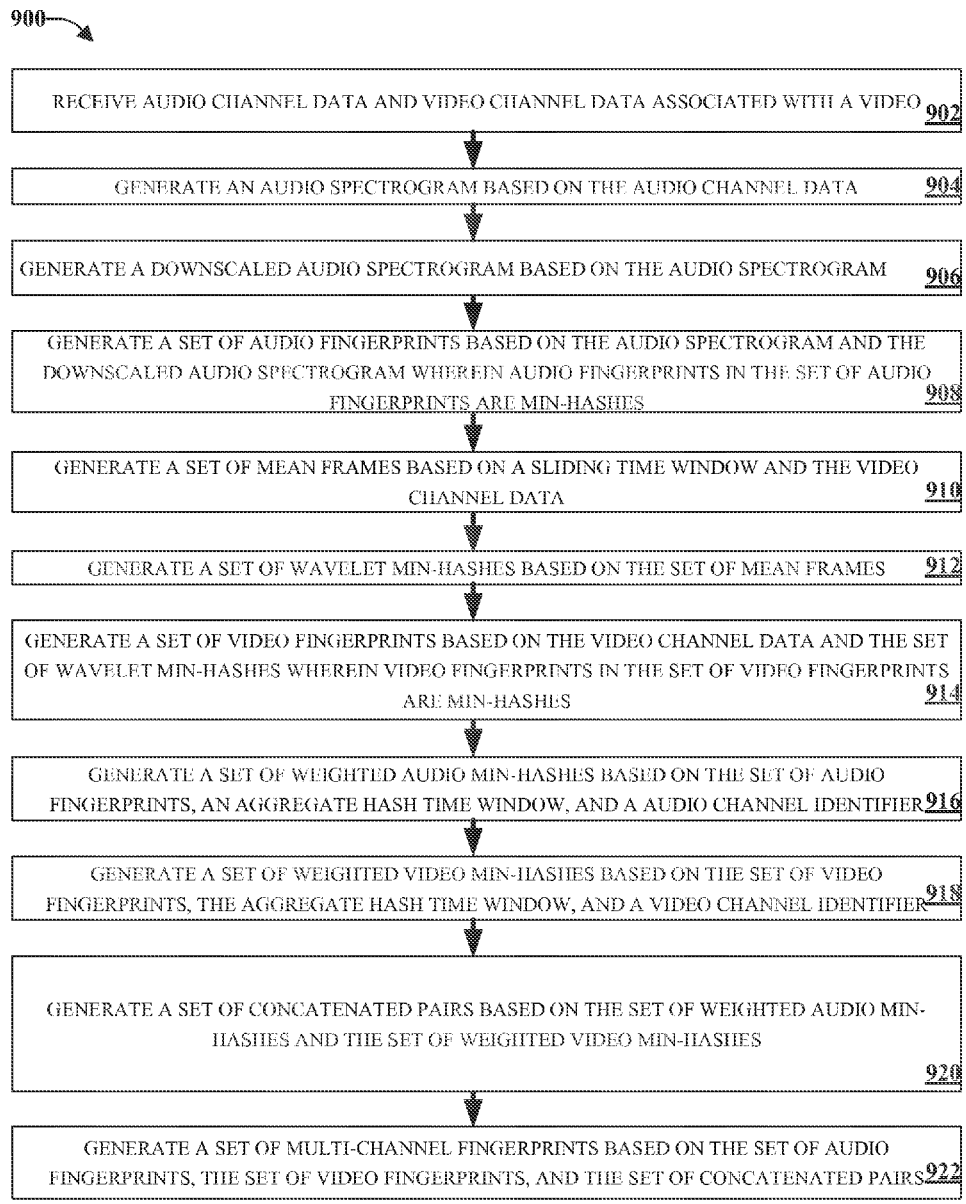
FIG. 9 illustrates an example method for generating multi-channel fingerprints including generating weighted audio and video min-hashes in accordance with implementations of this disclosure.

FIG. 9 illustrates an example method for generating multi-channel fingerprints including generating weighted audio and video min-hashes in accordance with implementations of this disclosure. At 902, audio channel data and video channel data associated with a video can be received. At 904, an audio spectrogram can be generated based on the audio channel data. At 906, a downscaled audio spectrogram can be generated based on the audio spectrogram. At 908, a set of audio fingerprints can be generated based on the audio spectrogram and the downscaled audio spectrogram wherein audio fingerprints in the set of audio fingerprints are min-hashes. At 910, a mean set of frames can be generated based on a sliding time window and the video channel data. At 912, a set of wavelet min-hashes can be generated based on the set of mean frames. At 914, a set of video fingerprints can be generated based on the video channel data and the set of wavelet min-hashes wherein video fingerprints in the set of video fingerprints are min-hashes.

At 916, a set of weighted audio min-hashes can be generated based on the set of audio fingerprints, an aggregate hash time window, and an audio channel identifier. At 918, a set of weighted video min-hashes can be generated based on the set of video fingerprints, the aggregate hash time window, and a video channel identifier. At 920, a set of concatenated pairs can be generated based on the set of weighted audio min-hashes and the set of weighted video min-hashes. In one implementation, concatenated pairs in the set of concatenated pairs are comprised of at least one weighted audio min-hash from the set of weighted audio min-hashes and at least one weighted video min-hash from the set of weighted video min-hashes. At 922, a set of multi-channel fingerprints can be generated based on the set of audio fingerprints, the set of video fingerprints, and the set of concatenated pairs.

Figure 10:
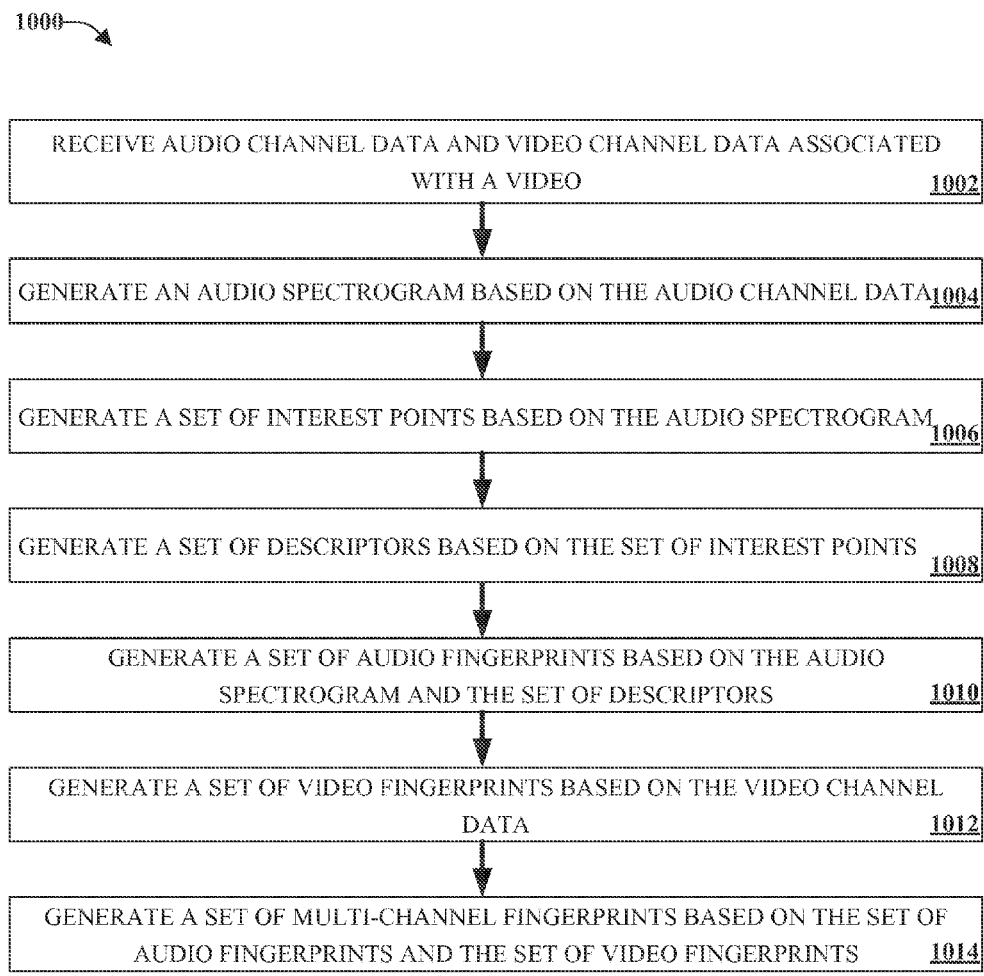
FIG. 10 illustrates an example method for generating multi-channel fingerprints including generating interest point based audio descriptors in accordance with implementations of this disclosure.

FIG. 10 illustrates an example method for generating multi-channel fingerprints including generating interest point based audio descriptors in accordance with implementations of this disclosure. At 1002, audio channel data and video channel data associated with a video can be received. At 1004, an audio spectrogram can be generated based on the audio channel data. At 1006, a set of interest points can be generated based on the audio spectrogram. At 1008, a set of descriptors can be generated based on the set of interest points. At 1010, a set of audio fingerprints can be generated based on the audio spectrogram and the set of descriptors. At 1012, a set of video fingerprints can be generated based on the video channel data. At 1014, a set of multi-channel fingerprints can be generated based on the set of audio fingerprints and the set of video fingerprints.

Figure 11:
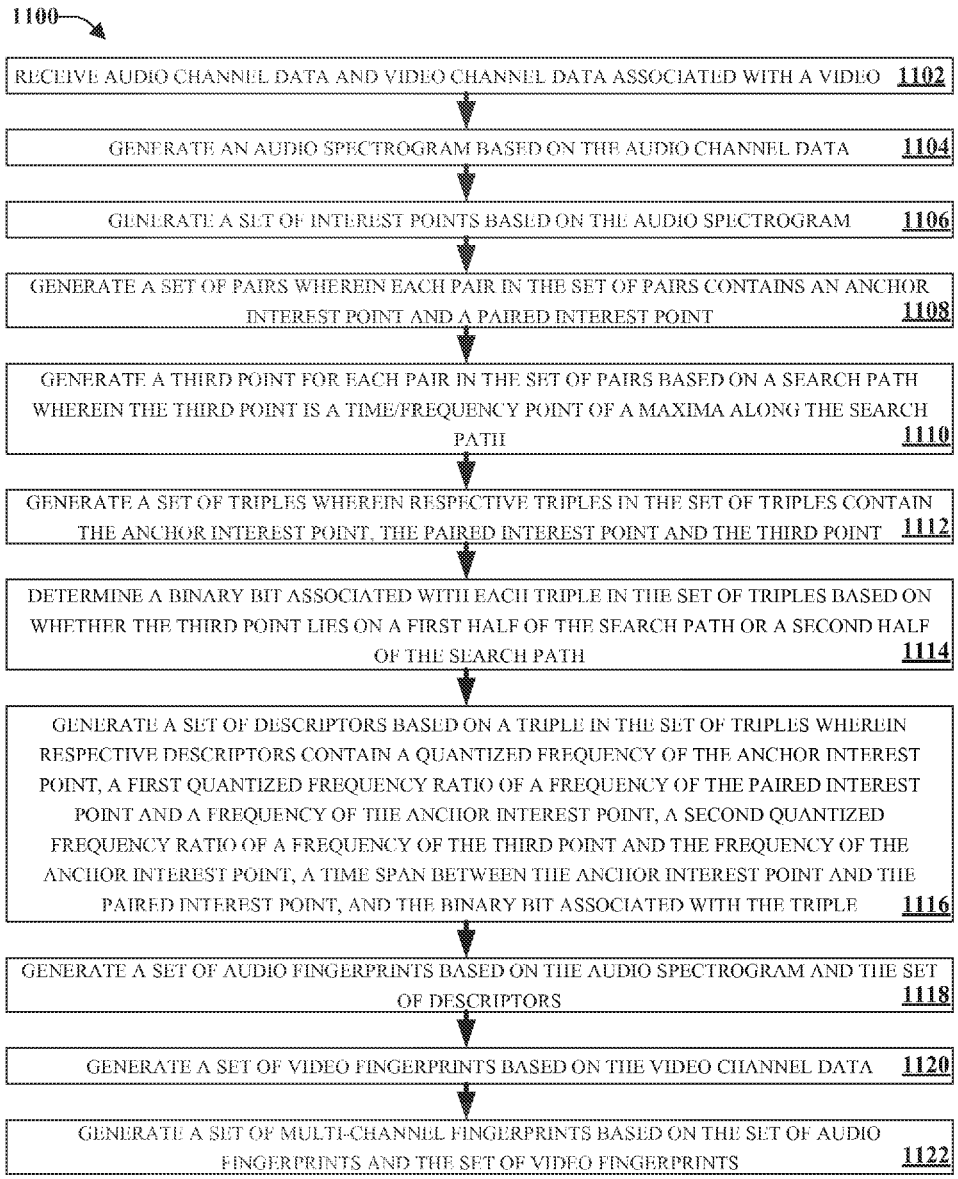
FIG. 11 illustrates an example method for generating multi-channel fingerprints including generating audio descriptors based on triples in accordance with implementations of this disclosure.

FIG. 11 illustrates an example method for generating multi-channel fingerprints including generating audio descriptors based on triples in accordance with implementations of this disclosure. At 1102, audio channel data and video channel data associated with a video can be received. At 1104, an audio spectrogram can be generated based on the audio channel data. At 1106, a set of interest points can be generated based on the audio spectrogram. At 1108, a set of pairs can be generated wherein each pair in the set of pairs contains an anchor interest point and a paired interest point. At 1110, a third point for each pair in the set of pairs can be generated based on a search path wherein the third point is a time/frequency point of a maxima along the search path. At 1112, a set of triples can be generated wherein respective triples in the set of triples contain the anchor interest point, the paired interest point and the third point. At 1114, a binary bit associated with each triple in the set of triples can be determined based on whether the third point lies on a first half of the search path or a second half of the search path.

At 1116, a set of descriptors can be generated based on a triple in the set of triples and contains a quantized frequency of the anchor interest point, a first quantized frequency ratio of a frequency of the paired interest point and a frequency of the anchor interest point, a second quantized frequency ratio of a frequency of the third point and the frequency of the anchor interest point, a time span between the anchor interest point and the paired interest point, and the binary bit associated with the triple. At 1118, a set of audio fingerprints can be generated based on the audio spectrogram and the set of descriptors. At 1120, a set of video fingerprints can be generated based on the video channel data. At 1122, a set of multi-channel fingerprints can be generated based on the set of audio fingerprints and the set of video fingerprints.

Figure 12:
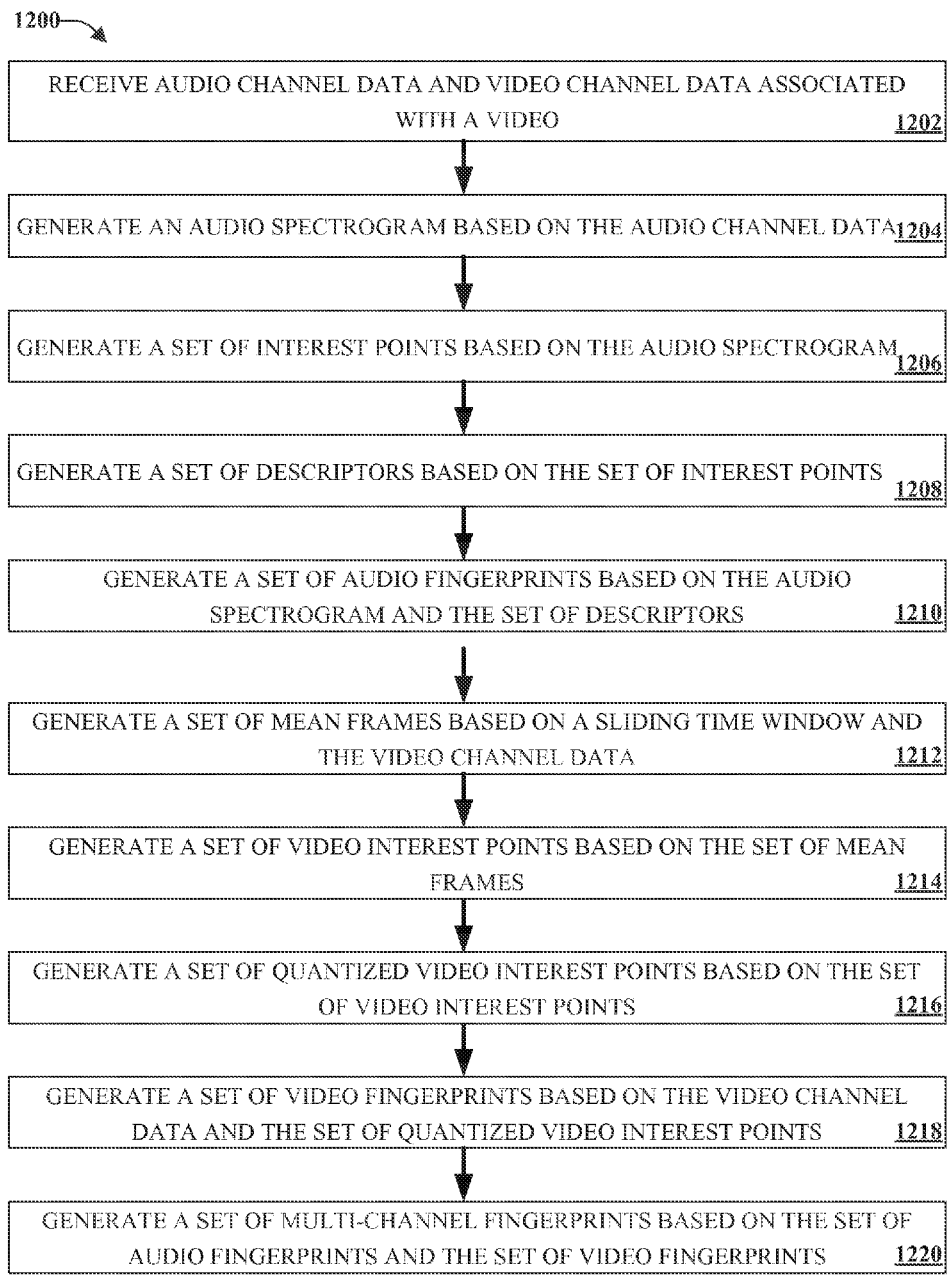
FIG. 12 illustrates an example method for generating multi-channel fingerprints including generating quantized video interest points in accordance with implementations of this disclosure.

FIG. 12 illustrates an example method for generating multi-channel fingerprints including generating quantized video interest points in accordance with implementations of this disclosure. At 1202, audio channel data and video channel data associated with a video can be received. At 1204, an audio spectrogram can be generated based on the audio channel data. At 1206, a set of interest points can be generated based on the audio spectrogram. At 1208, a set of descriptors can be generated based on the set of interest points. At 1210, a set of audio fingerprints can be generated based on the audio spectrogram and the set of descriptors.

At 1212, a set of mean frames can be generated based on a sliding time window and the video channel data. At 1214, a set of video interest points can be generated based on the set of mean frames. At 1216, a set of quantized video interest points can be generated based on the set of video interest points. At 1218, a set of video fingerprints can be generated based on the video channel data and the set of quantized video interest points. At 1220, a set of multi-channel fingerprints can be generated based on the set of audio fingerprints and the set of video fingerprints. In one implementation, generating the set of multi-channel fingerprints by combining an audio fingerprint from the set of audio fingerprints and a video fingerprint from the set of video fingerprints based on at least one of a common time off set, a closest in time off set, and a spatial similarity.

Figure 13:
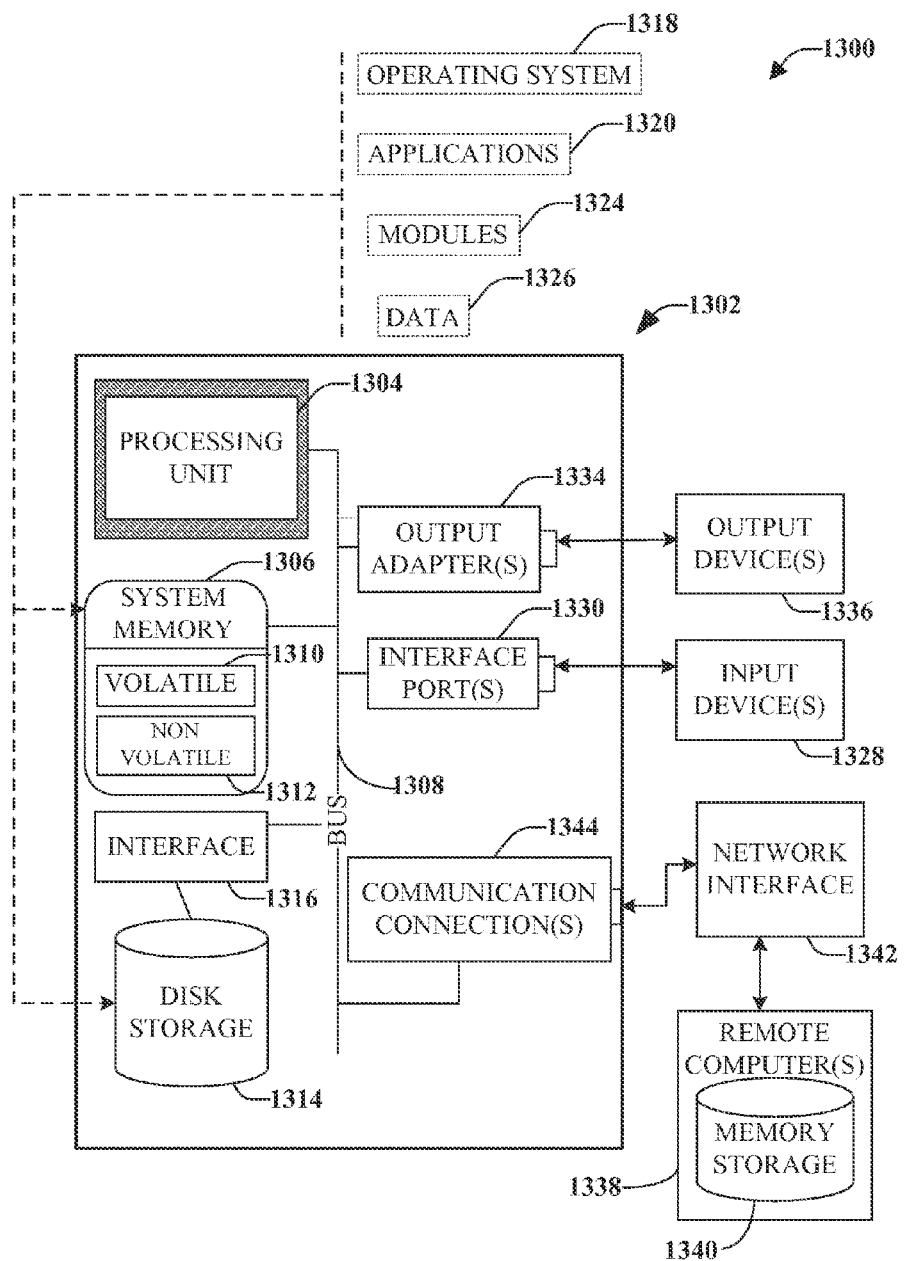
FIG. 13 illustrates an example block diagram of a computer operable to execute the disclosed architecture in accordance with implementations of this disclosure.

With reference to FIG. 13, a suitable environment 1300 for implementing various aspects of the claimed subject matter includes a computer 1302. It is to be appreciated that the computer, 1302 can be used in connection with implementing one or more of the systems or components shown and described in connection with FIGS. 1-4. The computer 1302 includes a processing unit 1304, a system memory 1306, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 1302 may also include removable/non-removable, volatile/non-volatile computer storage media. FIG. 13 illustrates, for example, a disk storage 1314. Disk storage 1314 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1314 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302, and to output information from computer 1302 to an output device 1336.

Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
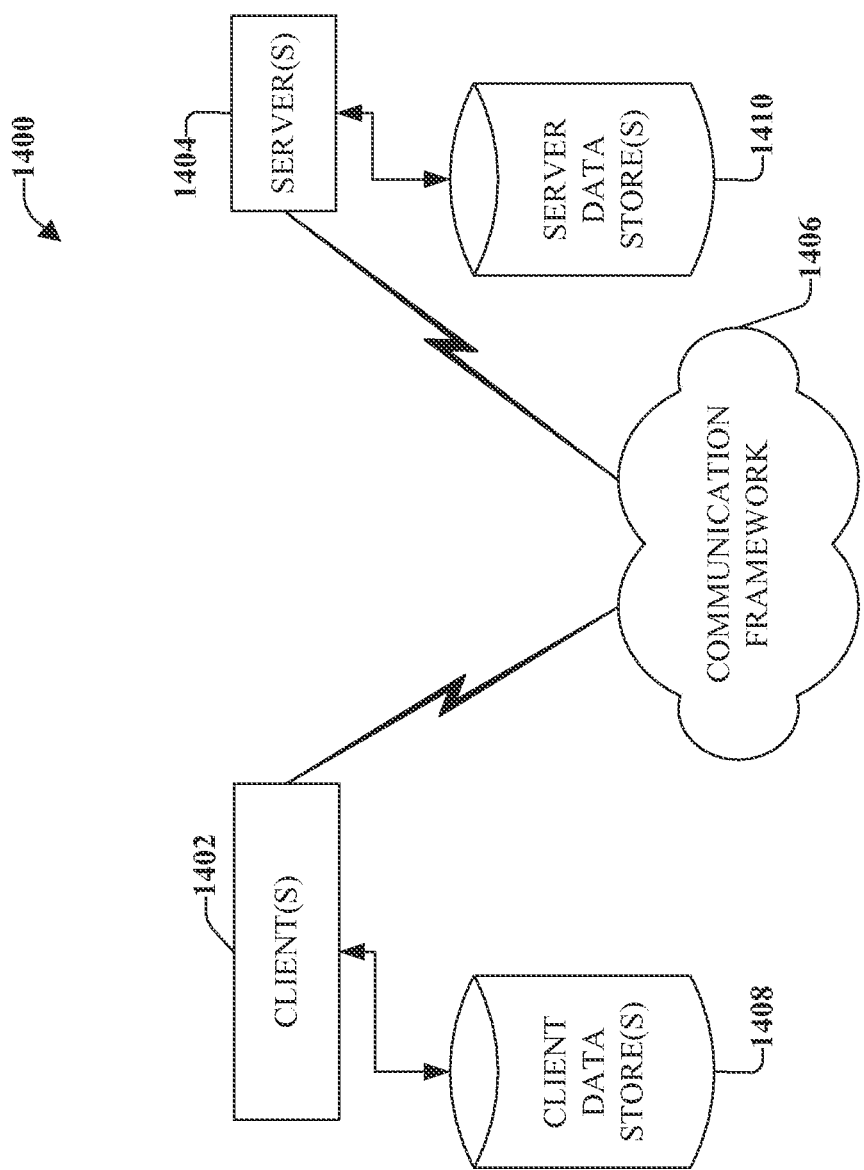
FIG. 14 illustrates an example schematic block diagram for a computing environment in accordance with implementations of this disclosure.

Referring now to FIG. 14, there is illustrated a schematic block diagram of a computing environment 1400 in accordance with the subject specification. The system 1400 includes one or more client(s) 1402, which can include an application or a system that accesses a service on the server 1404. The client(s) 1402 can be hardware and/or software (e.g., threads, processes, computing devices). The client(s) 1402 can house cookie(s), metadata, and/or associated contextual information and can also house threads to perform, for example, generating spectrograms, generating interest points, generating triples, processing video data, generating multi-channel fingerprints, generating single channel fingerprints, generating descriptors, etc. in accordance with the subject disclosure.

The system 1400 also includes one or more server(s) 1404. The server(s) 1404 can also be hardware or hardware in combination with software (e.g., threads, processes, computing devices). The servers 1404 can house threads to perform, for example, generating spectrograms, generating interest points, generating triples, processing video data, generating multi-channel fingerprints, generating single channel fingerprints, generating descriptors, etc. in accordance with the subject disclosure. One possible communication between a client 1402 and a server 1404 can be in the form of a data packet adapted to be transmitted between two or more computer processes where the data packet contains, for example, an audio sample, video sample, fingerprints, or spectrograms associated with an audio sample. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A computer-implemented method for generating multi-channel fingerprints, the method comprising:
   receiving audio channel data and video channel data associated with a video;
   generating a set of audio fingerprints based on the audio channel data;
   generating a set of mean frames of the video based on a sliding time window applied to the video channel data;
   generating a set of video fingerprints based on the set of mean frames of the video; and
   generating a set of multi-channel fingerprints based on both the set of audio fingerprints and the set of video fingerprints.

2. The computer-implemented method of claim 1, further comprising:
   generating an audio spectrogram based on the audio channel data; and
   generating a downscaled audio spectrogram based on the audio spectrogram, wherein the set of audio fingerprints is generated based on the downscaled audio spectrogram and wherein audio fingerprints in the set of audio fingerprints are min-hashes.

3. The computer-implemented method of claim 2, further comprising:
   generating a set of wavelet min-hashes based on the set of mean frames, wherein the set of video fingerprints is generated based on the set of wavelet min-hashes and wherein video fingerprints in the set of video fingerprints are min-hashes.

4. The computer-implemented method of claim 3, wherein generating the set of multi-channel fingerprints is based on concatenating min-hashes of audio fingerprints from the set of audio fingerprints and the min-hashes of video fingerprints from the set of video fingerprints.

5. The computer-implemented method of claim 4, wherein generating the set of multi-channel fingerprints is based on a consistent output rate.

6. The computer-implemented method of claim 3, further comprising:
   generating a set of weighted audio min-hashes based on the set of audio fingerprints, an aggregate hash time window, and an audio channel identifier;
   generating a set of weighted video min-hashes based on the set of video fingerprints, the aggregate hash time window, and a video channel identifier; and
   generating a set of concatenated pairs based on the set of weighted audio min-hashes and the set of weighted video min-hashes wherein generating the set of multi-channel fingerprints is based on the set of concatenated pairs.

7. The computer-implemented method of claim 6, wherein concatenated pairs in the set concatenated pairs are comprised of at least one weighted audio min-hash from the set of weighted audio min-hashes and at least one weighted video min-hash from the set of weighted video min-hashes.

8. The computer-implemented method of claim 2, further comprising:
   generating a set of interest points based on the audio spectrogram; and
   generating a set of descriptors based on the set of interest points;
   wherein the set of audio fingerprints is generated based on the set of descriptors.

9. The computer-implemented method of claim 8, further comprising:
   generating a set of pairs wherein each pair in the set of pairs contains an anchor interest point and a paired interest point;
   generating a third point for each pair in the set of pairs based on a search path wherein the third point is a time-frequency point of a maxima along the search path;

generating a set of triples wherein respective triples in the set of triples contain the anchor interest point, the paired interest point and the third point;

determining a binary bit associated with each triple in the set of triples based on whether the third point lies on a first half of the search path or a second half of the search path; and wherein generating descriptors in the set of descriptors is based on a triple in the set of triples and contains a quantized frequency of the anchor interest point, a first quantized frequency ratio of a frequency of the paired interest point and a frequency of the anchor interest point, a second quantized frequency ratio of a frequency of the third point and the frequency of the anchor interest point, a time span between the anchor interest point and the paired interest point, and the binary bit associated with the triple.

10. The computer-implemented method of claim 8, further comprising:

generating a set of video interest points based on the set of mean frames; and generating a set of quantized video interest points based on the set of video interest points wherein the set of video fingerprints is generated based on the set of quantized video interest points.

11. The computer-implemented method of claim 10, wherein generating the set of multi-channel fingerprints comprises:

combining an audio fingerprint from the set of audio fingerprints and a video fingerprint from the set of video fingerprints based on at least one of a common time offset, a closest in time offset, or a spatial similarity.

12. A computer program product comprising a non-transitory computer-readable storage medium storing executable code for generating multi-channel fingerprints, the code when executed by a computer processor cause the computer processor to perform steps comprising:

receiving audio channel data and video channel data associated with a video;

generating a set of audio fingerprints based on the audio channel data;

generating a set of mean frames of the video based on a sliding time window applied to the video channel data;

generating a set of video fingerprints based on the set of mean frames of the video; and generating a set of multi-channel fingerprints based on both the set of audio fingerprints and the set of video fingerprints.

13. The computer program product of claim 1, wherein the code when executed by the computer processor causes the computer processor to perform further steps comprising:

generating an audio spectrogram based on the audio channel data; and generating a downscaled audio spectrogram based on the audio spectrogram, wherein the set of audio fingerprints is generated based on the downscaled audio spectrogram and wherein audio fingerprints in the set of audio fingerprints are min-hashes.

14. The computer program product of claim 13, wherein the code when executed by the computer processor causes the computer processor to perform further steps comprising:

generating a set of wavelet min-hashes based on the set of mean frames, wherein the set of video fingerprints is generated based on the set of wavelet min-hashes and wherein video fingerprints in the set of video fingerprints are min-hashes.

15. The computer program product of claim 14, wherein generating the set of multi-channel fingerprints is based on concatenating min-hashes of audio fingerprints from the set of audio fingerprints and the min-hashes of video fingerprints from the set of video fingerprints.

16. The computer program product of claim 15, wherein generating the set of multi-channel fingerprints is based on a consistent output rate.

17. The computer program product of claim 14, wherein the code when executed by the computer processor causes the computer processor to perform further steps comprising:

generating a set of weighted audio min-hashes based on the set of audio fingerprints, an aggregate hash time window, and an audio channel identifier;

generating a set of weighted video min-hashes based on the set of video fingerprints, the aggregate hash time window, and a video channel identifier; and generating a set of concatenated pairs based on the set of weighted audio min-hashes and the set of weighted video min-hashes wherein generating the set of multi-channel fingerprints is based on the set of concatenated pairs.

18. The computer program product of claim 17, wherein concatenated pairs in the set concatenated pairs are comprised of at least one weighted audio min-hash from the set of weighted audio min-hashes and at least one weighted video min-hash from the set of weighted video min-hashes.

19. The computer program product of claim 13, wherein the code when executed by the computer processor causes the computer processor to perform further steps comprising:

generating a set of interest points based on the audio spectrogram; and generating a set of descriptors based on the set of interest points;

wherein the set of audio fingerprints is generated based on the set of descriptors.

20. The computer program product of claim 13, wherein the code when executed by the computer processor causes the computer processor to perform further steps comprising:

generating a set of pairs wherein each pair in the set of pairs contains an anchor interest point and a paired interest point;

generating a third point for each pair in the set of pairs based on a search path wherein the third point is a time-frequency point of a maxima along the search path;

generating a set of triples wherein respective triples in the set of triples contain the anchor interest point, the paired interest point and the third point;

determining a binary bit associated with each triple in the set of triples based on whether the third point lies on a first half of the search path or a second half of the search path; and wherein generating descriptors in the set of descriptors is based on a triple in the set of triples and contains a quantized frequency of the anchor interest point, a first quantized frequency ratio of a frequency of the paired interest point and a frequency of the anchor interest point, a second quantized frequency ratio of a frequency of the third point and the frequency of the anchor interest point, a time span between the anchor interest point and the paired interest point, and the binary bit associated with the triple.

21. The computer program product of claim of claim 19, wherein the code when executed by the computer processor causes the computer processor to perform further steps comprising:

generating a set of video interest points based on the set of mean frames; and generating a set of quantized video interest points based on the set of video interest points wherein the set of video fingerprints is generated based on the set of quantized video interest points.

22. The computer program product of claim 21, wherein generating the set of multi-channel fingerprints comprises:

combining an audio fingerprint from the set of audio fingerprints and a video fingerprint from the set of video fingerprints based on at least one of a common time offset, a closest in time offset, or a spatial similarity.

* * * * *